United States Patent [19]
Brinkmann et al.

[11] Patent Number: 5,358,693
[45] Date of Patent: Oct. 25, 1994

[54] METHOD AND APPARATUS FOR THE SINGLE-STAGE CONTINUOUS PRODUCTION OF A RUBBER BASE COMPOUND AND A RUBBER END COMPOUND

[75] Inventors: Heinz Brinkmann, Springe; Gerd Capelle, Langenhagen, both of Fed. Rep. of Germany

[73] Assignee: Hermann Berstorff Maschinenbau GmbH, Hanover, Fed. Rep. of Germany

[21] Appl. No.: 107,614

[22] Filed: Aug. 18, 1993

Related U.S. Application Data

[62] Division of Ser. No. 806,364, Dec. 13, 1991, Pat. No. 5,302,635.

[30] Foreign Application Priority Data

Dec. 14, 1990 [DE] Fed. Rep. of Germany ....... 4039943

[51] Int. Cl.$^5$ ............ C08F 2/00; B01F 7/00; B28C 5/08; A21C 1/06
[52] U.S. Cl. ............ 422/137; 422/134; 422/135; 422/138; 422/229; 366/66; 366/75; 366/76; 366/79; 366/83; 366/85; 366/99
[58] Field of Search ........... 422/131, 132, 133, 134, 422/135, 136, 137, 138, 224, 229; 366/53, 55, 56, 58, 64, 65, 66, 75, 76, 79, 83, 84, 85, 88, 94, 95, 97, 99; 524/571–572; 525/331.9, 332.4–332.6

[56] References Cited

U.S. PATENT DOCUMENTS

| 3,563,514 | 2/1971 | Shattuck | 366/75 |
| 3,825,236 | 7/1974 | Hussmann | 366/76 |
| 3,917,507 | 11/1975 | Skidmore | 366/83 |
| 3,963,558 | 6/1976 | Skidmore | 366/83 |
| 3,985,348 | 10/1976 | Skidmore | 366/76 |
| 4,107,787 | 8/1978 | Ocker | 366/84 |
| 4,110,844 | 8/1978 | Nakamura | 366/83 |
| 4,124,306 | 11/1978 | Bredeson et al. | 366/75 |
| 4,260,264 | 4/1981 | Maki et al. | 366/76 |
| 4,416,543 | 11/1983 | Brinkmann | 366/80 |
| 4,462,691 | 7/1984 | Boguslawski | 366/90 |
| 4,599,002 | 7/1986 | Gutknecht | 366/85 |
| 4,875,847 | 10/1989 | Wenger et al. | 366/83 |
| 4,897,236 | 1/1990 | Räbiger et al. | 264/211.23 |
| 5,011,291 | 4/1991 | Peter | 366/91 |
| 5,045,325 | 9/1991 | Lesko et al. | 366/83 |
| 5,158,725 | 10/1992 | Handa et al. | 264/40.7 |

FOREIGN PATENT DOCUMENTS

1142839 1/1963 Fed. Rep. of Germany.

*Primary Examiner*—Robert J. Warden
*Assistant Examiner*—Christopher Y. Kim
*Attorney, Agent, or Firm*—Walter Ottesen

[57] ABSTRACT

The invention is directed to a method and an arrangement for continuously producing a rubber base compound and a rubber end compound in a single stage for vehicle tires, drive belts, conveyor belts as well as for industrial rubber products. The rubber base compound and the rubber end compound are produced continuously in one and the same mixing arrangement which includes a twin-screw extruder.

13 Claims, 3 Drawing Sheets

METHOD AND APPARATUS FOR THE SINGLE-STAGE CONTINUOUS PRODUCTION OF A RUBBER BASE COMPOUND AND A RUBBER END COMPOUND

This is a division of application Ser. No. 07/806,364, filed Dec. 13, 1991, U.S. Pat. No.5,302,635.

FIELD OF THE INVENTION

The invention relates to a method and an apparatus for the single-stage, continuous production of a rubber base compound and a rubber end compound for vehicle tires, drive belts, conveyor belts and industrial rubber products.

BACKGROUND OF THE INVENTION

Rubber compounds which constitute the starting material of each elastomeric product such as tires, conveyor belts, seals, elastic bellows and the like are complex reactive multicomponent systems which generally comprise rubber, processing (softener) oil to stretch the polymer and to improve the processing characteristics, chemicals for obtaining special characteristics such as fire protection and light protection, bonding agents, reinforcing filler substances such as soot, silicic acid or fibers for increasing the mechanical strength, and vulcanizing systems comprising vulcanizing agents, activators, accelerators and retarders.

Because of the different forms (lumps, granular material, powder, liquid), the extremely different viscosities and the very considerably different parts by weight (for example, one part sulfur to 100 parts rubber), the mixing of these individual substance components constitutes a method and machine task which is most difficult. In addition, a special significance is imparted to the process for producing the compounds since the physical and chemical characteristics of an elastomeric manufactured product is not only dependent upon the formulation of the rubber compound but also on the compounding technology. Accordingly, the sequence of metering of rubber, soot and softener has a considerable influence on the soot dispersion and therefore on the mechanical strength of the manufactured part.

According to the present state of the art, rubber compounds are almost exclusively produced in closed mixers characterized as masticators.

A closed mixer assembly comprises a metering system, weighing system and transport system as well as the closed mixer, an extruder or roller assembly for converting the charge of the closed mixer to rubber sheets, a refrigerating unit for the sheets and a positioning or cutting device.

The actual compounding process takes place in a chamber having two closable openings and two rotors rotating in mutually opposite directions which are arranged parallel and equipped with masticating elements. The walls of the compounding chamber, the rotors, the charging ram and the discharge saddle flap are temperature controlled by circulating liquid. The substance components are supplied with an actuated ram via the feed shaft while liquids are injectable via nozzles directly into the mixing chamber. The edges of the rotating masticating blades define gaps in which the material is sheared and dispersed. The masticating elements are so configured that the mixing charge is forcibly conveyed in the longitudinal and peripheral directions. The flow division resulting from the laminar flow field and the rearrangement cause a distributive mixing effect. At the end of a cycle, the mixing chamber is opened by pivoting the saddle flap and the compounded piece is discharged by the conveying action of the rotors.

The holding time or cycle time required to obtain a homogeneous compound is empirically determined for each formulation. The process is controlled to end when the pregiven values of the time, rotor torque, rotor revolutions, the temperature of the material being mixed or the energy supplied are reached.

The energy supplied via the rotors is for the most part dissipated in the highly viscous polymer mass. Because of the thermally unfavorable surface/volume ratio of the mixing chamber, the dissipation heat can only be transferred to a limited extent. The temperature increase of the material being mixed resulting therefrom forms the basis of one of the most serious disadvantages of the closed mixing process, namely: in order to avoid a premature start of the temperature-dependent vulcanizing reaction, a rubber compound must generally be produced with a closed mixer in several steps. In the first step, all non-reactive constituents are mixed. In the case of high concentrations of a charging substance and thermal instability of the polymers, several cycles can already be required for this purpose.

The premix characterized as the base compound is cooled down from approximately 100° C. to 160° C. to 20° C. to 40° C. after being discharged from the closed mixer and thereafter supplied to the end compound stage. There, the reactive vulcanizing chemicals are mixed into the base compound likewise with a closed mixer with a temperature of approximately 80° C. to 120° C. not being permitted to be exceeded. The end compound contains all constituents after this stage and is, in turn, cooled down to 20° C. to 40° C. In many cases, the end compound is stored in advance of further processing for 20 to 40 hours in order to raise the quality of the material being mixed to the required level via diffusive material transport during this storage time.

The production of rubber compounds with closed mixers is burdened with two substantial disadvantages. On the one hand, a closed mixer can principally be driven only discontinuously. From this, an interruption in the continuous manufacturing sequence results with organizational and logistical problems. On the other hand, the danger is present of fluctuations in quality because start-up effects occur with each cycle because of the intermittent operation.

Secondly, the temperature of the material being mixed is influenced only within narrow limits and it is for this reason that the mixing process must be carried out in several stages and, after each mixing stage, a reshaping and cooling must take place. Because of the multiple stages, the following consequences occur: the mixing time is lengthened, a very large energy requirement has to be satisfied because of the repeated plasticization and cooling of the compound and the necessity arises of providing storage and transport capacities for the intermediate compounds.

Because of these disadvantages of the closed mixer, the development of alternate mixing apparatus was begun already in the 1960s. Thus, the transfer mix extruder known, for example, from published German patent application DE-AS 11 42 839 was investigated as to its suitability as a rubber mixer. The foregoing concerns a single-screw extruder wherein not only the rotating screw but also the stationary cylinder has conveyance paths. The material is transferred several times from the conveying paths of the screw into those of the cylinder and back whereby a good mixing effect is obtained. However, because of thermal reasons, the combination of the production of rubber base compounds and rubber end compounds in a continuous process sequence and achieving this in only one mixing arrangement was not possible.

A twin-shaft machine known from published German patent application DE-AS 16 79 829 is likewise suited only for end mixing. A Farrel continuous mixer comprises essentially two shafts journalled at opposite ends and rotating in mutually opposite directions with the shafts being configured as conveying screws in the input area and as masticating blades in the output area. The holding time can be influenced via the rotational speed of the shafts and a throttle in the output cross section.

Furthermore, a single-shaft machine developed by Buss AG and characterized as a co-masticator has become known for producing rubber compounds. In this single-shaft machine, the blades of the screws in the co-masticator are penetrated over the surface in a manner comparable to a pin extruder. During the rotation, these breakthroughs engage masticating teeth fixed in the cylinder. To increase the mixing action in the longitudinal direction, the shaft carries out an oscillating longitudinal movement with each rotation (Kautschuk und Gummi, Kunststoffe, 38th year, no. 2/85, pages 116 to 121).

Finally, a method and an arrangement for producing rubber compounds is known from U.S. Pat. No. 5,011,291 wherein two closed mixers are arranged in series. The first closed mixer supplies the base compound of the rubber while the second closed mixer takes over the task of the end compound. The second closed mixer is located directly below the mixer for the rubber base compound so that the rubber base compound can be guided directly into the finish mixer as a charge and can be further processed there.

It is true that with this method procedure the very costly cooling and reheating via the intermediate storage of the base compound is avoided, it is however disadvantageous, as with all other methods and arrangements according to the state of the art, that a continuous production of rubber end compounds is not possible. In addition, the capability of cooling the second closed mixer operating as a finish mixer is poor as before because of its comparatively poor ratio of coolable surface to the quantity being mixed disposed in the mixer.

As an alternative to the closed mixer, in actual practice no alternative could prevail for overwhelming technical reasons such as inadequate mixing capacity or thermal problems. The state of the art of producing rubber compounds is as before the closed mixer developed on the basis of a dough masticating machine.

SUMMARY OF THE INVENTION

It is therefore an object of the invention to provide a method and an arrangement with which a rubber end compound is produced economically in one operating step starting with crude rubber without intermediately storing the rubber for cooling and for diffusion substance exchange. It is another object of the invention to provide such a method and arrangement wherein there is no vulcanization of the rubber in the mixing apparatus.

With the production method made available by the invention as well as with the production arrangement according to the invention, substantial advantages are obtained with respect to the closed mixers primarily used previously. In addition to the improvement of the quality of the end compound producible continuously, significant savings result in the production costs which is made evident with respect to an example.

The closed mixers conventional today are mostly built in sizes of 50 to 500 liter mixing chamber volumes. A machine size used very often in all component areas of the rubber processing industry is the 350 liter mixer for which the following comparative economic evaluation is carried out.

The costs for the production of 1 kg of vulcanizable rubber compounds are on average as follows:

| | |
|---|---|
| cost of material | 85% |
| wage-dependent manufacturing costs | 8% |
| machine-dependent manufacturing costs | 7% |
| | 100% |

For the production costs, a maximum of savings potential of 15% results.

In Table 1, the individual positions, from which the production costs are assembled, are listed, for the conventional method with closed mixers and for the newly developed method. The costs for the closed mixer process constitute reliable experience values of the rubber processing industry. The costs for the new development of the assignee herein are conservatively estimated on the basis of long years of experience with extrusion equipment. This cost comparison includes the following individual assumptions or experience values:

TABLE 1

| Cost Breakdown for the Production of Rubber Compounds | | | |
|---|---|---|---|
| | Closed Mixer | | Method according |
| | Base Compound DM/ton | End Compound DM/ton | to Invention DM/ton |
| Wage-Dependent Manufacturing Costs | 33.70 | 33.70 | 22.50 |
| Machine-Dependent Manufacturing Costs: | | | |
| Electrical Energy | 37.20 | 13.70 | 59.20 |
| Cooling | 3.70 | 3.30 | 5.-- |
| Maintenance | 25.80 | 22.90 | |
| Fixed Costs | 51.90 | 51.90 | 42.40 |
| Costs for Ancillary Tasks: | | | |
| Weighing and controlling chemicals | 26.10 | 12.40 | 26.10 |
| Transport and Storage | 23.90 | 24.40 | -.-- |
| Clearing Compound | -.-- | 27.50 | -.-- |
| Waste | 1.-- | 1.-- | 1.-- |
| Total Costs | 203.30 | 190.80 | 156.20 |
| | | 394.10 | |

With a closed mixer having a size of 350 liters, approximately 2,300 kg/h can be produced with conventional values of mixing time, charging level and preparation time in the three-shift operation. The cost breakdown is referenced to this throughput.

The compound as a rule is produced in two stages in the production with closed mixers. In the first stage, the base compound is produced and in the second stage, the end compound is produced. For this purpose, two complete machine pass-throughs are required which must be operated each with three operators. In contrast thereto, the subject matter of the invention requires only two operators.

The computation of the fixed costs is based on an amortization time of 15 years and an interest rate of 6%. The sum invested is composed of the costs for the metering equipment and charging equipment, the mixing equipment including drive and control and for a batch-off unit. In the case of an initial installation, additional costs occur for a precomminution of the crude rubber generally delivered in the form of lumps as well as a safety surcharge of 20% for the additional costs which cannot be estimated at the present time.

The most disadvantageous case is assumed for the installation of a laboratory unit in that several compound constituents cannot be individually metered continuously because concentrations are too low. For producing a premixture of these compound constituents, the costs are inserted in the position "weighing and controlling of chemicals" in the order of magnitude usual for the closed mixer process. The costs for transport, storage and compound clearance are in contrast unnecessary since the compound produced with the suggested arrangement is directly further processed to the end product.

This cost overview is deliberately carried out with the most unfavorable assumptions and provides a reduction of the production costs of 60.4% for the method according to the invention. In 1988, a total of 2.83 million tons of rubber compounds were produced in Europe with an average price of 8,000.00 DM/t. With a share of 15% production costs, the invention makes a savings possible within this reference frame of DM 2,051,184,000.00 alone for the European rubber industry. This means a considerable improvement in competitive capability by using the subject matter of the invention suggested here.

From the continuous operation of the production arrangement driven according to the method of the invention, not only economic advantages result but also technical advantages. For each compounding cycle, thermal start-up effects occur in the present day conventional closed mixers as a consequence of the intermittent operation. The process is only quasi steady state. In a continuous process as it is suggested here, the danger of fluctuations in quality is reduced by a multiple.

The geometry of a closed mixer is not changeable or changeable only at relatively high cost. With the modular configuration of the production arrangement according to the invention, the geometry of the compounding and conveying elements can be optimally matched to the rubber compound to be produced from which an optimal compound quality results. The cost intensive clearance tests (see Table 1) are unnecessary because of the very good quality of the compound and its time-dependent consistency. In addition, it is no longer necessary for many rubber compounds to intermediately store the same for the purpose of diffuse compensating operations. The material can be further processed to a semifinished product or to an end product directly after the mixing process without renewed plasticizing.

BRIEF DESCRIPTION OF THE DRAWINGS

The invention will now be explained with reference to the drawings, wherein:

FIG. 2 is a longitudinal section view taken through two twin-screw extruders (D, E) in which the rubber base compound and the end compound are separately but continuously producible;

DESCRIPTION OF THE PREFERRED EMBODIMENTS OF THE INVENTION

Figure 1:
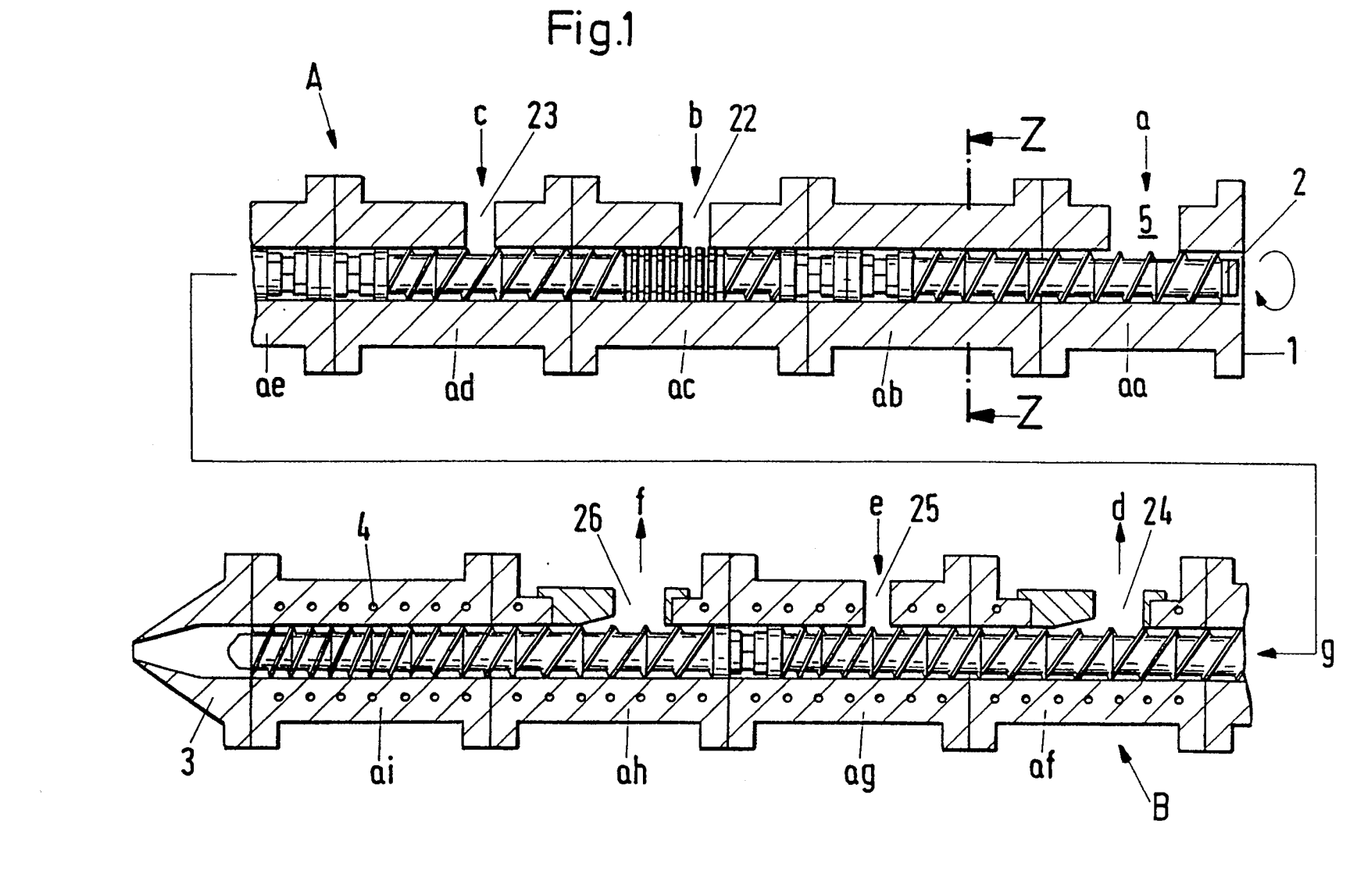
FIG. 1 is a longitudinal section view taken through a twin-screw extruder having main process zones A and B for the continuous production of the rubber base compound and for the rubber end compound in one operation.

The method according to the invention can be carried out, for example, with an arrangement according to FIG. 1 with the arrangement including a twin-screw extruder. The extruder housing 1 is assembled from housing sections (aa) to (ai) connected with each other in a row and has: a charging opening 5 for the crude rubber, a plurality of additional charging and devolatilizing openings 22 to 26 as well as an extruder nozzle 3 at its downstream end through which the rubber end compound leaves the extruder.

In the extruder housing 1, two intermeshing extruder screws 2 (FIG. 4) rotate which have different tasks in the different housing sections. In correspondence to these tasks, the extruder screws 2 have the same screw geometries with respect to each other but with these screw geometries being different in the conveying direction (for example, masticating, shearing, mixing, throttling, conveying geometries).

In the following, the production of a rubber end compound is described to make clear the operation of such an extruder.

The extruder is subdivided into two main process zones (A, B) in which the production of the rubber base compound (zone A) and the production of the rubber end compound (zone B) take place continuously. For this purpose, crude rubber (a) is supplied continuously to the extruder through the feed opening 5. The extruder screws 2, configured for conveying in this extruder region, receive the crude rubber and build up a conveying pressure. In the region of housing sections (ab, ac), the crude rubber is plasticized and homogenized and provided with chemicals as well as a softener (b) which are fed into the extruder through the housing opening 22.

These additives are then mixed with the crude rubber and prepared to a homogeneous compound.

Thereafter, soot or talcum (c) is fed into the extruder through the housing opening 23 in the housing section (ad) as further non-reactive compound component. These additives are processed via the extruder screws with the extrudate to a homogeneous rubber compound.

The extruder temperature increases from approximately 25° C. of the crude rubber to 150° C. to 160° C. in the extruder section (ae) within this main processing zone A of the extruder. In this zone A of the extruder, only the non-reactive mixture components are fed into the extruder and a twin-screw extruder having a self-cleaning capability is used. For this reason, neither vulcanization effects nor deposits of extrudate occur here.

In the main method zone B starting with the housing section (af), the extrudate is cooled to a temperature in the range of 100° C. to 120° C. by means of a cooling arrangement for the extruder housing. This temperature reduction is necessary since in this zone B of the extruder, the rubber end compound is produced by mixing in the reactive mixture constituents. Exceeding this temperature range would bring about an undesired premature vulcanization of the rubber compound.

The cooling of the extrudate takes place in this embodiment by means of a liquid cooling medium, for example, water, which is conducted through bores 4 in the extruder housing 1. A heat exchanger connected to the extruder but not shown takes care of the dissipation of the excess amount of heat from the cooling liquid.

As a departure from this embodiment, the cooling of the extruder housing can, however, also take place via cooling channels provided around the housing outer wall although a cooling via the extruder screws is also conceivable. In addition, another heat exchanger liquid can be used in dependence upon the quantity of heat to be transferred which can be still free flowing even at initial temperatures of below 0° C.

The rubber base compound (g) which has reached the main process zone B is then cooled in housing section (af) and, according to FIG. 1, liberated from gaseous extrudate constituents (d) via a devolatilizing opening 24. In the housing section (ag), the reactive compound constituents (f) such as sulfur and reaction accelerators are supplied to the rubber compound via the feed opening 25. Thereafter, the extrudate, while being continuously cooled, is mixed with these additives and processed to a homogeneous rubber compound. In the extruder region formed by the housing section (ah), the extrudate is liberated once more from its volatile constituents (f) via the housing opening 26 in order, finally, in the region of the housing section (ai), to be brought to the necessary pressure by the extruder screws 2. The extrudate leaves the twin-screw extruder finally via the extrusion nozzle 3 as rubber end compound which is so well homogenized that no further intermediate storage is necessary for the random material transfer which was conventional up to now and therefore can be transported away directly for continuous further processing.

Figures 2, 4:
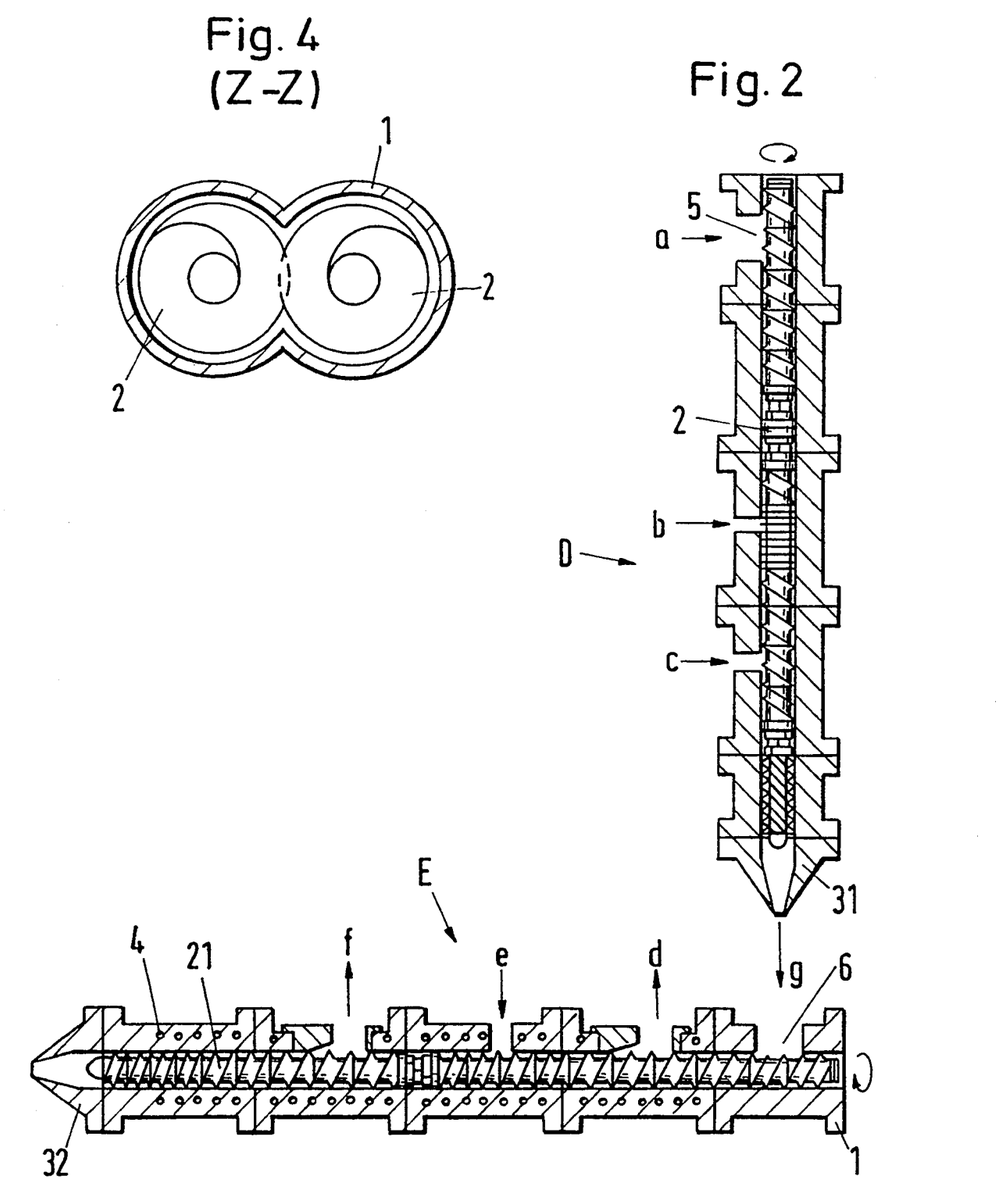

A variation of the arrangement according to the invention is shown in FIG. 2. In this embodiment, the base compound is produced in a first twin-screw extruder D and the end compound is produced in a second twin-screw extruder E. The extruders D, E are assembled in a manner comparable to the extruder of FIG. 1; however, the main process zone A is realized in extruder D and the main process zone B is realized in extruder E. The supply of the mixture components as well as the devolatilizing of the extrudate takes place at the same housing openings as in the extruder according to FIG. 1 and under the same thermal conditions. The rubber base compound (g) produced in the extruder D is fed directly into the feed opening 6 for the base compound in the extruder E and is there processed further to the rubber end compound.

Compared to the state of the art, in this embodiment of the arrangement of the invention, the base compound also does not have to be intermediately stored for cooling down and thereafter brought to a required temperature level in a second mixing arrangement with the temperature level being necessary for mixing in the reactive mixture components.

Figure 3:
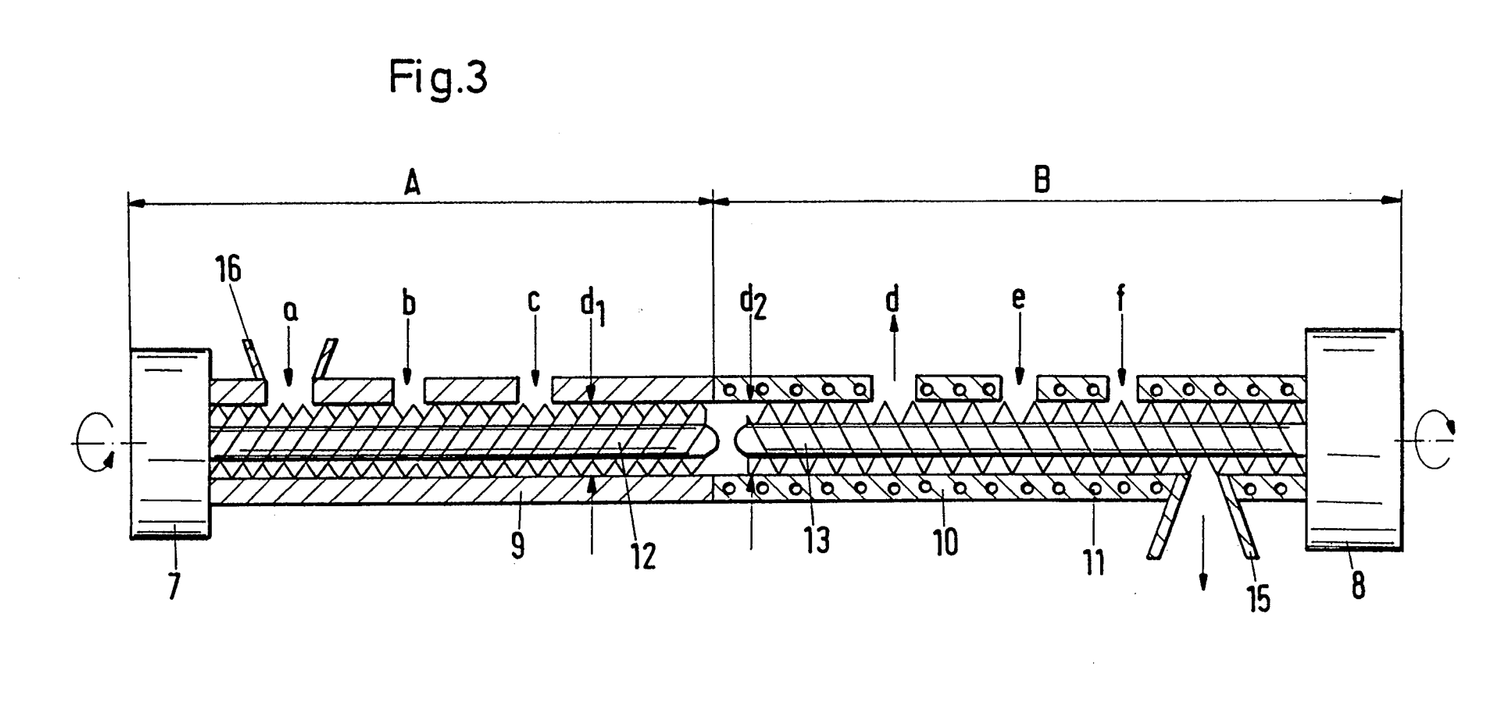
FIG. 3 is a longitudinal section view taken through a twin-screw extruder wherein two screw pairs are mounted which are driven independently of each other; and, FIG. 4 is a section view taken along line Z—Z of FIG. 1 through the extruder housing.

In still another embodiment, the arrangement is formed by a twin-screw extruder according to FIG. 3 for carrying out the method of the invention. This extruder has two screw pairs 12, 13 which are driven at mutually opposite ends of the extruder housing 9, 10 by drive units 7, 8. The extruder housing is here also subdivided into two main method zones A, B which can be determined by the length of the extruder screws and/or by the extruder housing sections provided with or without cooling channels 11. The screws 13 of zone B have a greater diameter than the screws 12 of zone A and the inner diameters of the housing regions 9, 10 are configured in the same or similar ratio to each other.

The crude rubber (a) is filled into the extruder via an inlet opening 16 where the crude rubber is homogenized and plasticized in the region of the main method zone A and provided with the non-reactive mixture components (b, c) necessary for producing the rubber base compound. In the method zone B, the extrudate is devolatilized (d, f) and provided with the reactive mixture constituents (e). The compounding constituents (e) are mixed with continuous cooling into the base compound and processed with the base compound at a temperature of 100° C to 120° C. to a homogeneous end compound. Finally, the end compound leaves the mixing arrangement via the extruder outlet opening 15.

The rubber compound produced at a laboratory scale with the method of the invention in an embodiment of the arrangement of the invention according to FIG. 1 was excellent notwithstanding previous skepticism. This was that much more surprising because skilled persons in this area of technology were burdened for decades with the disadvantages of the closed mixers and a use of the twin-screw extruder for continuously producing rubber end compounds was not previously discussed. The quality of the end compound obtained can be judged with respect to experimental examples.

| Formulation A (Passenger Car Tire Tread) | |
| --- | --- |
| Mixing Components | Percentage by Weight |
| rubber SBR 1712 | 58.0 |
| soot N 339 | 31.6 |
| aromatic oil | 6.3 |
| antiaging agent IPPD | 0.6 |
| stearic acid | 0.8 |
| zinc oxide | 1.3 |
| sulfur | 0.6 |
| accelerator VDM/C | 0.5 |
| accelerator VD/C | 0.3 |
| | 100.0 |

The rubber utilized in this mixing experiment had a feed temperature of 25° C. and the temperature of the extrudate in the extruder section (ae) was 160° C. Ahead of the inlet opening 25 for the reactive mixing components, an extrudate temperature of 105° C. was measured which could be maintained along the entire main method zone with deviations of ±5° C. The temperature of the extrudate just ahead of the extruder nozzle was determined to be 115° C. For a screw diameter of 90 ram, the method zone A = 18 (screw diameter) and in the method zone B was likewise = 18 (screw diameter). Approximately 500 to 600 kg of end compound per hour were produced with the arrangement described. The end compound was of a very good homogeneity and had a significantly better degree of soot dispersion compared to compounds produced in closed mixers. The scattering of the rheometer curves for investigating the vulcanization performance of the compounds also showed a significantly better result in comparison. For the same extruder dimensions and temperature levels, approximately 500 kg of end compound per hour was produced in an experiment for producing an end compound for truck tire treads pursuant to formulation B. In principle, the same comparison results were obtained.

| Formulation B (Truck Tire Tread) | |
| --- | --- |
| Mixing Components | Percentage of Weight |
| natural rubber RSS3 | 60.5 |
| soot N 220 | 30.2 |
| aromatic oil | 1.8 |
| antiaging agent IPPD | 0.6 |
| antiaging agent TMQ | 0.6 |
| wax for protection against light | 0.9 |
| stearic acid | 1.8 |
| zinc oxide | 1.8 |
| accelerator MBS | 0.9 |
| sulfur | 0.9 |
| | 100.0 |

In a third experiment, the end compound for automotive profiles according to formulation C was produced according to the method of the invention. Here too, the temperatures are maintained at the level mentioned above and 400 kg per hour were produced. The quality of the end compound was excellent also in this experiment.

| Formulation C (Automotive Profile) | |
| --- | --- |
| Mixing Components | Percentage of Weight |
| rubber EPDM | 23.0 |
| zinc oxide | 1.2 |
| stearic acid | 0.2 |
| soot N 550 | 29.0 |
| chalk | 18.7 |
| naphthene base petroleum | 26.5 |
| accelerator TP/S | 0.7 |
| accelerator TMTD | 0.3 |
| accelerator MBT | 0.2 |
| sulfur | 0.2 |
| | 100.0 |

It is understood that the foregoing description is that of the preferred embodiments of the invention and that various changes and modifications may be made thereto without departing from the spirit and scope of the invention as defined in the appended claims.

What is claimed is:

1. An apparatus for continuously producing a rubber base compound (g) and a rubber end compound in a single stage from crude rubber, the arrangement including:

twin-screw extruder having a housing and having a predetermined length subdivided into two zones A and B along said length so as to be disposed one behind the other;

two intermeshing screws rotatably mounted in said housing and defining respective longitudinal axes;

drive means for driving each of said screws about the longitudinal axis corresponding thereto;

first crude rubber inlet means formed in said housing for admitting said crude rubber (a) into said extruder wherein the crude rubber (a) is plasticized and homogenized;

second crude rubber non-reactive mixing additives inlet means formed in said housing within said zone A for admitting said non-reactive mixing additives needed for producing the base compound (g) into the twin-screw extruder at preselected distances along said zone A whereby said non-reactive mixing additives become mixed and homogenized with the crude rubber in said extruder at temperatures in the range of 100° C. to 160° C. to form the base compound (g);

cooling means in said zone B for cooling the base compound (g) down to a temperature in the range of 100° C. to 120° C.;

third crude rubber reactive mixing additives inlet means formed in said housing within said zone B for admitting all said reactive mixing additives needed for producing the end compound into the twin-screw extruder at preselected distances along said zone B whereby said reactive mixing additives become mixed and homogenized with said base compound (g); and, cooling means being arranged along said zone B for maintaining the temperature of said base compound within said range of 100° C. to 120° C. as said reactive mixing additives are mixed and homogenized with said base compound (g) thereby preventing vulcanization and producing the rubber end product.

2. The apparatus of claim 1, said drive means being configured to rotate said screws in the same direction about said axes, respectively.

3. The apparatus of claim 1, said drive means being configured to rotate said screws mutually opposite directions about said axes, respectively.

4. The apparatus of claim 1, further comprising a plurality of devolatilizing openings formed in said housing for conducting volatile constituents away from the extrudate.

5. The apparatus of claim 4, said second and third inlet means including a plurality of inlet openings and said inlet openings and said devolatilizing openings being arranged along said length of said extruder and being located at respective distances from said first inlet means in dependence upon the following: the substance to be supplied or removed, the particular quantity of the substance, the rotational speed of the screws, the extrudate throughput per unit of time and the viscosity of the crude rubber (a).

6. The apparatus of claim 4, said screws each having a predetermined diameter (D), said first inlet means comprising a charging opening formed in said housing; said second and third inlet means including a plurality of inlet openings; and, said charging opening, said inlet openings and said devolatilizing openings being spaced one from the other along said length of said extruder at a distance of (0.5 to 10) times said diameter (D).

7. The apparatus of claim 1, said screws each having a predetermined diameter D and said length of said extruder being represented by $L_T$ and being up to 60 times said diameter D, said zone A having a length $L_A$ from 30% to 70% of said length $L_T$ and said zone B having a length $L_B$ from 70% to 30% of said length $L_T$; and, said lengths $L_A$ and $L_B$ being selected in dependence upon said non-reactive and reactive additives.

8. The apparatus of claim 7, wherein said zone A has a length $L_A = 0.5(L_T)$ and said zone B has a length $L_B = 0.5(L_T)$.

9. The apparatus of claim 1, said cooling means including channel means for conducting a coolant.

10. The apparatus of claim 9, said channel means including a plurality of bores formed in said housing for conducting said coolant.

11. The apparatus of claim 9, said housing having an outer surface and said channel means being a flow channel formed around said housing and on said outer surface for conducting said coolant.

12. An apparatus for continuously producing a rubber base compound (g) and a rubber end compound in a single stage from crude rubber, the arrangement including:
- a first twin-screw extruder having a first housing and having a predetermined first length;
- a first pair of two intermeshing screws rotatably mounted in said first housing and defining respective longitudinal axes;
- first drive means for driving each of said screws of said first pair about the longitudinal axis corresponding thereto;
- a second twin-screw extruder having a second housing and having a predetermined second length;
- a second pair of two intermeshing screws rotatably mounted in said second housing and defining respective longitudinal axes;
- second drive means for driving each of said screws of said second pair about the longitudinal axis corresponding thereto;
- first crude rubber inlet means formed in said first housing for admitting said crude rubber (a) into said first twin-screw extruder wherein the crude rubber (a) is plasticized and homogenized;
- second crude rubber non-reactive mixing additives inlet means formed in said first housing for admitting said non-reactive mixing additives needed for producing the base compound (g) into said first twin-screw extruder at preselected distances along said first housing whereby said non-reactive mixing additives become mixed and homogenized with the crude rubber in said first twin-screw extruder at temperatures in the range of 100° C. to 160° C. to form the base compound (g);
- outlet means for conducting the base compound (g) out of said first housing and said first twin-screw extruder;
- third inlet means formed in said second housing for continuously receiving said base compound (g) from said first twin-screw extruder;
- cooling means in said second twin-screw extruder for cooling the base compound (g) down to a temperature in the range of 100° C. to 120° C.;
- fourth crude rubber reactive mixing additives inlet means formed in said second housing for admitting all said reactive mixing additives needed for producing the end compound into said second twin-screw extruder at preselected distances along said second housing whereby said reactive mixing additives become mixed and homogenized with said base compound (g); and,
- said cooling means being arranged along said second twin-screw extruder for maintaining the temperature of said base compound within said range of 100° C. to 120° C. as said reactive mixing additives are mixed and homogenized with said base compound (g) thereby preventing vulcanization and producing the rubber end product.

13. An apparatus for continuously producing a rubber base compound (g) and a rubber end compound in a single stage from crude rubber, the arrangement including:
- extruder having a housing and having a predetermined length subdivided into two zones A and B along said length so as to be disposed one behind the other;
- first pair of intermeshing screws rotatably mounted in said housing in said zone A thereof and defining respective longitudinal axes;
- first drive means for driving each of the screws of said first pair about the longitudinal axis corresponding thereto;
- a second pair of intermeshing screws rotatably mounted in said housing in said zone B thereof and defining respective longitudinal axes;
- second drive means for driving each of the screws of said second pair about the longitudinal axis corresponding thereto;
- first crude rubber inlet means formed in said housing for admitting said crude rubber (a) into zone A of said extruder wherein the crude rubber (a) is plasticized and homogenized;
- second crude rubber non-reactive mixing additives inlet means formed in said housing within said zone a for admitting said non-reactive mixing additives needed for producing the base compound (g) into the twin-screw extruder at preselected distances along said zone A whereby said non-reactive mixing additives become mixed and homogenized with the crude rubber in said extruder at temperatures in the range of 100° C. to 160° C. to form the base compound (g);
- cooling means in said zone B for cooling the base compound (g) down to a temperature in the range of 100° C. to 120° C.;
- third crude rubber reactive mixing additives inlet means formed in said housing within said zone B for admitting all said reactive mixing additives needed for producing the end compound into tile twin-screw extruder at preselected distances along said zone B whereby said reactive mixing additives become mixed and homogenized with said base compound (g);
- said cooling means being arranged along said zone B for maintaining the temperature of said base compound within said range of 100° C. to 120° C. as said reactive mixing additives are mixed and homogenized with said base compound (g) thereby preventing vulcanization and producing the rubber end product; and,
- each of the screws of said first pair of tightly intermeshing screws having a diameter $d_1$ and each of the screws of said second pair of tightly intermeshing screws having a diameter $d_2$ greater than said diameter $d_1$.

* * * * *

UNITED STATES PATENT AND TRADEMARK OFFICE
CERTIFICATE OF CORRECTION

PATENT NO.  : 5,358,693
DATED       : October 25, 1994
INVENTOR(S) : Heinz Brinkmann and Gerd Capelle It is certified that error appears in the above-identified patent and that said Letters Patent is hereby corrected as shown below:

In column 4, line 25: between "listed" and "for", delete -- , --.

In column 8, line 61: delete "90 ram" and substitute -- 90 mm -- therefor.

In column 10, line 19: before "cooling", insert -- said --.

In column 10, line 31: between "screws" and "mutually", insert -- in --.

In column 12, line 12: before "first", insert -- a --.

In column 12, line 31: delete "a" and substitute -- A -- therefor.

In column 12, line 45: delete "tile" and substitute -- the -- therefor.

Signed and Sealed this

Seventeenth Day of January, 1995

Attest:

BRUCE LEHMAN

*Attesting Officer*     *Commissioner of Patents and Trademarks*